(12) United States Patent
Liang et al.

(10) Patent No.: US 9,444,987 B2
(45) Date of Patent: Sep. 13, 2016

(54) INTERACTIVE IMAGING SYSTEM AND REMOTE CONTROLLER APPLIED THERETO

(71) Applicant: PixArt Imaging Inc, Hsin-chu County (TW)

(72) Inventors: Chia-Cheun Liang, Hsin-chu (TW); Chao-Chien Huang, Hsin-chu (TW); Chi-Yang Huang, Hsin-chu (TW); Wen-Yu Yang, Hsin-chu (TW); Hung-Yu Lee, Hsin-chu (TW)

(73) Assignee: PIXART IMAGING INC, Hsin-Chu County (TW)

( * ) Notice: Subject to any disclaimer, the term of this patent is extended or adjusted under 35 U.S.C. 154(b) by 224 days.

(21) Appl. No.: 13/930,385

(22) Filed: Jun. 28, 2013

(65) Prior Publication Data

US 2014/0015990 A1 Jan. 16, 2014

(30) Foreign Application Priority Data

Jul. 13, 2012 (TW) .............................. 101125276 A (51) Int. Cl.
*H04N 5/232* (2006.01)
*H04N 5/04* (2006.01)
*H04N 21/422* (2011.01)
*H04N 5/44* (2011.01)

(52) U.S. Cl.
CPC ............ *H04N 5/23203* (2013.01); *H04N 5/04* (2013.01); *H04N 21/42222* (2013.01); *H04N 2005/4405* (2013.01); *H04N 2005/4428* (2013.01); *H04N 2005/4432* (2013.01)

(58) Field of Classification Search
None
See application file for complete search history.

(56) References Cited

U.S. PATENT DOCUMENTS

| 2007/0002021 | A1* | 1/2007 | Lin | ..................... G06F 3/0317 345/166 |
| 2009/0135262 | A1* | 5/2009 | Ogasawara | ............ G03B 15/02 348/211.4 |
| 2013/0044232 | A1* | 2/2013 | Zhang | .................... G08C 17/02 348/211.99 |

FOREIGN PATENT DOCUMENTS

| CN | 101388138 A | 3/2009 |
| CN | 201477518 U | 5/2010 |
| TW | 201039048 A1 | 11/2010 |

* cited by examiner

*Primary Examiner* — Seokyun Moon
*Assistant Examiner* — Douglas M Wilson
(74) *Attorney, Agent, or Firm* — Hauptman Ham, LLP (57) ABSTRACT

An interactive imaging system includes an image system and a remote controller. The image system includes at least one reference beacon, a receiving unit and a host. The at least one reference beacon emits light in an emission pattern. The receiving unit is configured to receive a packet data. The host controls an enable time of the at least one reference beacon according to the packet data. The remote controller includes an image sensor and a transmission unit. The image sensor captures the light emitted from the at least one reference beacon at a sampling period. The transmission unit sends the packet data corresponding to the sampling period of the image sensor.

20 Claims, 5 Drawing Sheets

INTERACTIVE IMAGING SYSTEM AND REMOTE CONTROLLER APPLIED THERETO

CROSS REFERENCE TO RELATED APPLICATION

This application claims the priority benefit of Taiwan Patent Application Serial Number 101125276, filed on Jul. 13, 2012, the full disclosure of which is incorporated herein by reference.

BACKGROUND

1. Field of the Disclosure

This disclosure generally relates to an interactive system and, more particularly, to an interactive imaging system capable of synchronizing, in a unidirectional manner, the image sensor and reference beacons and a remote controller applied to the interactive imaging system.

2. Description of the Related Art

Interactive control mechanism can provide users a more instinctive control and thus it has been broadly applied to various multimedia systems, especially to an image display system having a display screen.

Figure 1:
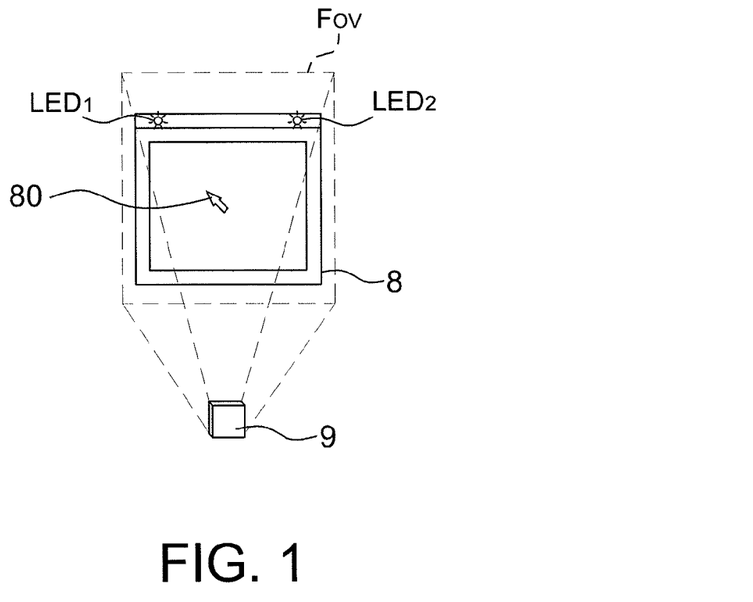
FIG. 1 shows a schematic diagram of the conventional interactive imaging system.

Referring to FIG. 1, an interactive imaging system generally includes an image display 8, an image sensor 9 and two light sources LED1 and LED 2. The image sensor 9 is generally disposed in a remote controller and configured to capture images containing the light sources LED1 and LED 2. The remote controller sends a control signal to the image display 8 according to a position variation of the light sources LED1 and LED 2 in the captured images to accordingly control a cursor 80 shown thereon.

To distinguish the light sources LED1 and LED2 from ambient light, the light sources LED1 and LED2 is controlled to emit light in a predetermined emission pattern so as to eliminate the ambient light not emitting in the predetermined emission pattern.

However, in order to allow the image sensor 9 to be able to correctly receive the light emitted from the light sources LED1 and LED2, a sampling frequency of the image sensor 9 has to match an emission interval of the light sources LED1 and LED2. Conventionally, it is able to increase the sampling frequency of the image sensor 9 to capture images, i.e. oversampling, and to analyze the emission pattern of the light sources LED 1 and LED2 in the captured images so as to distinguish ambient light. Another way to match the sampling frequency with the emission interval is to perform the bidirectional synchronization between the image sensor 9 and the light sources LED1 and LED2. However, both methods mentioned above can increase the occupied system resources.

Accordingly, the present disclosure further provides an interactive imaging system and a remote controller applied to the interactive imaging system that may perform the synchronization procedure between the image sensor and reference beacons in a unidirectional manner thereby reducing the occupied system resources.

SUMMARY

The present disclosure provides an interactive imaging system and a remote controller applied thereto that do not need to perform the bidirectional synchronization.

The present disclosure further provides an interactive imaging system and a remote controller applied thereto that may perform the synchronization procedure between the image sensor and reference beacons in a unidirectional manner according to the transmission packets of the remote controller.

The present disclosure provides an interactive imaging system including an image system and a remote controller. The image system includes at least one reference beacon, a receiving unit and a host. The at least one reference beacon emits light in an emission pattern. The receiving unit is configured to receive a packet data. The host is configured to control an enable time of the at least one reference beacon according to the packet data. The remote controller includes an image sensor and a transmission unit. The image sensor is configured to capture the light emitted from the at least one reference beacon at a sampling period. The transmission unit is configured to send the packet data corresponding to the sampling period of the image sensor.

The present disclosure further provides a synchronization method of an interactive imaging system including the steps of: capturing, using an image sensor, images at a sampling period; sending, using a transmission unit, a packet data corresponding to the sampling period of the image sensor; receiving the packet data with a receiving unit; and controlling, using a host, an enable time of at least one reference beacon according to the packet data thereby synchronizing the enable time to the sampling period.

The present disclosure further provides an interactive imaging system including an image system and a remote controller. The image system includes a reference beacon, a receiving unit and a host. The reference beacon emits light in an emission pattern. The receiving unit is configured to receive a packet data. The host is configured to control an enable time of the reference beacon according to the packet data. The remote controller includes a transmission unit, an image sensor and a processing unit. The transmission unit is configured to send the packet data. The image sensor is configured to receive the light emitted by the reference beacon at a sampling period. The processing unit is configured to calculate a time ratio of a time interval that the image sensor receives the light emitted from the reference beacon with respect to the sampling period for determining a shift time and to add information of the shift time to the packet data.

The present disclosure further provides a remote controller applied to an interactive imaging system and including an image sensor and a transmission unit. The image sensor is configured to capture images at a sampling period. The transmission unit is configured to send a packet data at a transfer time corresponding to the sampling period of the image sensor.

In one aspect, the host estimates the enable time according to a processing time for processing the packet data, wherein the processing time may include a decompression time and/or a decoding time.

In one aspect, the transmission unit sends the packet data synchronizing to a rising edge or a falling edge of sampling signal of the sampling period of the image sensor or delaying the rising edge or the falling edge of sampling signal of the sampling period of the image sensor by a predetermined time interval.

In one aspect, when the transmission unit sends the packet data synchronizing to the rising edge of sampling signal, the enable time is controlled to delay the processing time by a time difference between the sampling period and the processing time; and when the transmission unit sends the packet data synchronizing to the falling edge of sampling signal, the enable time is controlled to delay the processing time by a time difference between a half of the sampling period and the processing time.

In one aspect, when the transmission unit sends the packet data delaying the rising edge of sampling signal by the predetermined time interval, the enable time is controlled to delay the processing time by a time difference between the sampling period and a summation of the processing time and the predetermined time interval. The predetermined time interval may include a compression time and/or an encoding time. When the transmission unit sends the packet data delaying the falling edge of sampling signal by the predetermined time interval, the enable time is controlled to delay the processing time by a time difference between a half of the sampling period and a summation of the processing time and the predetermined time interval In one aspect, the image system further has a memory unit configured to previously save information of the processing time and the sampling period.

In the interactive imaging system and the synchronization method of the present disclosure, the host may accomplish the synchronization procedure between the image sensor and the reference beacon by controlling or delaying the enable time of the reference beacon to synchronize to the rising edge of sampling signal of the sampling period according to the packet data, and the delayed time interval may be determined at the image sensor end or the remote controller end.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 2:
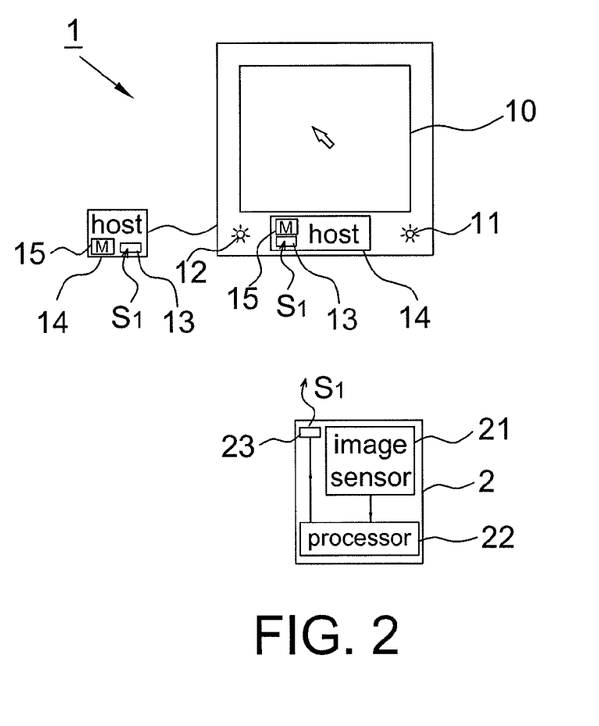
FIG. 2 shows a schematic diagram of the interactive imaging system according to an embodiment of the present disclosure.

Referring to FIG. 2, it shows a schematic diagram of the interactive imaging system according to an embodiment of the present disclosure. The interactive imaging system of this embodiment includes an image system 1 and a remote controller 2, wherein the image system 1 may be the image system including a display screen 10, such as a television, a projection system, a computer system, a game system or the like. The remote controller 2 is configured to be operated by a user (not shown) for controlling the image system 1, e.g. controlling an application executed by the image system 1 or controlling images or the cursor motion shown by the image system 1. In other words, the user may interact with the image system 1 through the remote controller 2.

The image system 1 includes at least one reference beacon (e.g. two reference beacons 11, 12 are shown herein), a receiving unit 13 and a host 14, wherein the receiving unit 13 may be disposed inside or outside the host 14. The host 14 may be combined with a display device to form the image system 1, e.g. a television, or may be coupled to but physically separated from the display device to form the image system 1, e.g. a game system. More specifically speaking, the connection and arrangement of every component of the image system 1 shown in FIG. 2 are only exemplary but not to limit the present disclosure. It should be mentioned that FIG. 2 is to show that the host 14 may or may not be integrated with a display device but not to show that the display system 1 includes two hosts 14. It should be mentioned that the at least one reference beacon is not limited to two and when more reference beacons are included, each reference beacon may emit light in an individual emission pattern.

The at least one reference beacon, e.g. including a first reference beacon 11 and a second reference beacon 12 herein, may be a light emitting diode or a laser diode, and preferably emit light in an individual emission pattern. For example referring to FIG. 3A, the first reference beacon 11 may emit light in an emission pattern "ON OFF ON OFF . . . ", whereas the second reference beacon 12 may emit light in an emission pattern "ON ON OFF ON ON OFF . . . ". In this manner, the remote controller 2 may recognize different reference beacons according to different emission patterns and accordingly eliminate the interference from ambient light.

The receiving unit 13 is configured to receive a packet data $S_1$ from the remote controller 2, wherein the packet data $S_1$ may be implemented by RF transmission technology, infrared light transmission technology, Bluetooth transmission technology or other wireless transmission technologies. In other words, the packet data $S_1$ may be a RF signal, infrared light signal, Bluetooth signal or other wireless signals.

The host 14 firstly processes information included in the packet data $S_1$ and identifies whether the packet data $S_1$ comes from the remote controller 2 or not. When the host 14 confirms that the packet data $S_1$ indeed comes from the remote controller 2, the host 14 controls an enable time of the at least one reference beacon according to the packet data $S_1$, e.g. controlling an enable time $ET_{11}$ of the first reference beacon 11 and an enable time $ET_{12}$ of the second reference beacon 12 (referring to FIG. 3A), and controls the operation of the image system 1 according to the packet data $S_1$, e.g. controlling the cursor motion or the frame update, wherein operations that the host 14 controls the image system 1 according to the packet data $S_1$ sent from the remote controller 2 are well known, and in the present disclosure the host 14 is further to control the operation of the at least one reference beacon to synchronize to the image capturing of the remote controller 2 according to the packet data $S_1$.

The remote controller 2 includes an image sensor 21, a processing unit 22 and a transmission unit 23.

Figure 3A:
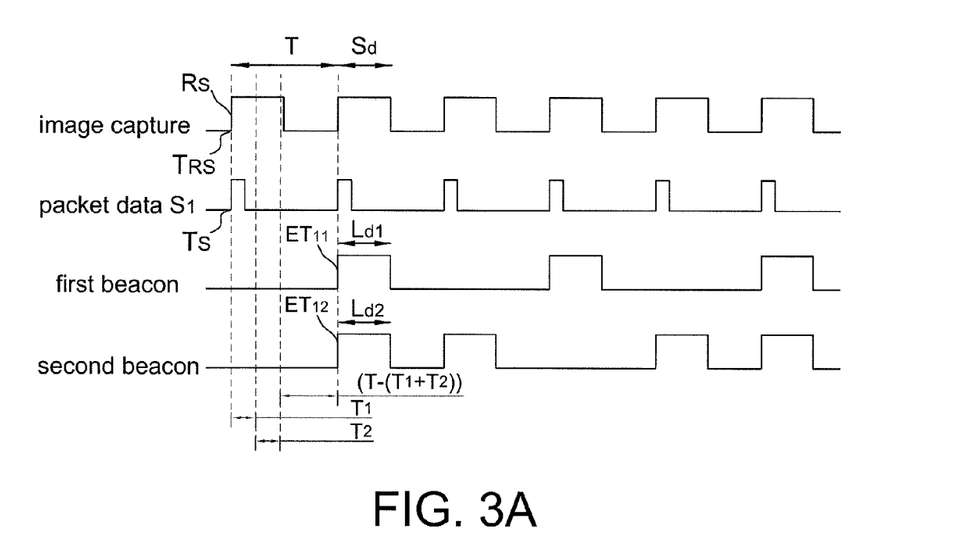
FIGS. 3A-3C show operational schematic diagrams of the synchronization method of the interactive imaging system according to a first embodiment of the present disclosure.

The image sensor 21 may be a CCD image sensor, a CMOS image sensor or the like, and is configured to capture images at a sampling period so as to receive light emitted from the at least one reference beacon. Referring to FIG. 3A, for example the image sensor 21 may capture light emitted from the first reference beacon 11 and the second reference beacon 12 at a sampling period T.

The processing unit 22 may be a digital signal processor (DSP) and is configured to process the images outputted by the image sensor 21 and calculate the variation of the at least one reference beacon in the images to obtain beacon information thereof, such as the variation of coordinate, displacement and/or direction vector. The processing unit 22 is further configured to perform the process of compressing and/or encoding the beacon information and then send the processed beacon information to the transmission unit 23.

In this embodiment, the transmission unit 23 sends a packet data $S_1$ at a transfer time $T_S$ corresponding to the sampling period T of the image sensor 21, wherein the transfer time $T_S$ may synchronize to a rising edge of sampling signal $R_S$ of the sampling period T, synchronize to a falling edge of sampling signal $F_S$ of the sampling period T, be a time delaying the rising edge of sampling signal $R_S$ by a predetermined time interval $T_0$ or be a time delaying the falling edge of sampling signal $F_S$ by a predetermined time interval $T_0$.

The processing unit 22 controls the transmission unit 23 to send the packet data $S_1$ at the transfer time $T_S$ (referring to FIG. 3A) corresponding to a rising edge of sampling signal $R_S$ of the sampling period T of the image sensor 21, wherein the transmission unit 23 sends the packet data $S_1$ by means of wireless transmission technologies.

Figure 3B:
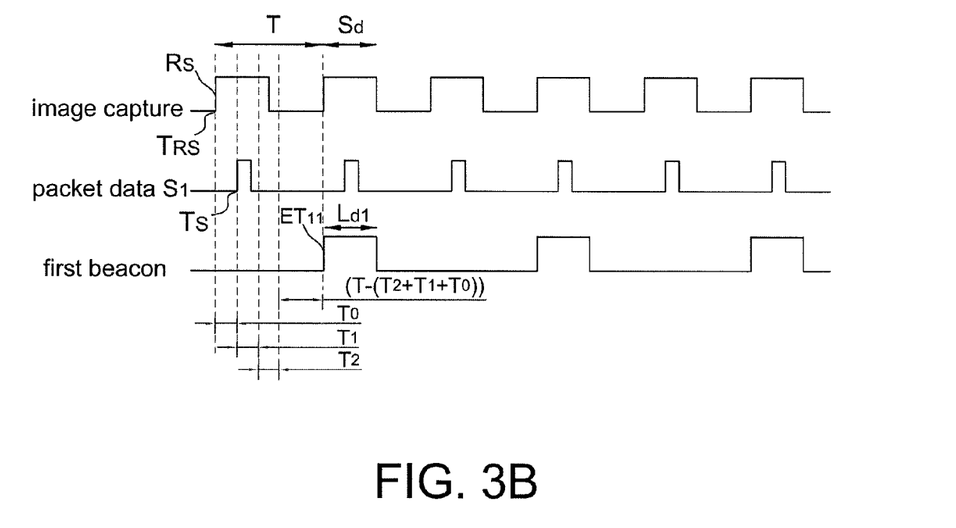
Figure 3C:
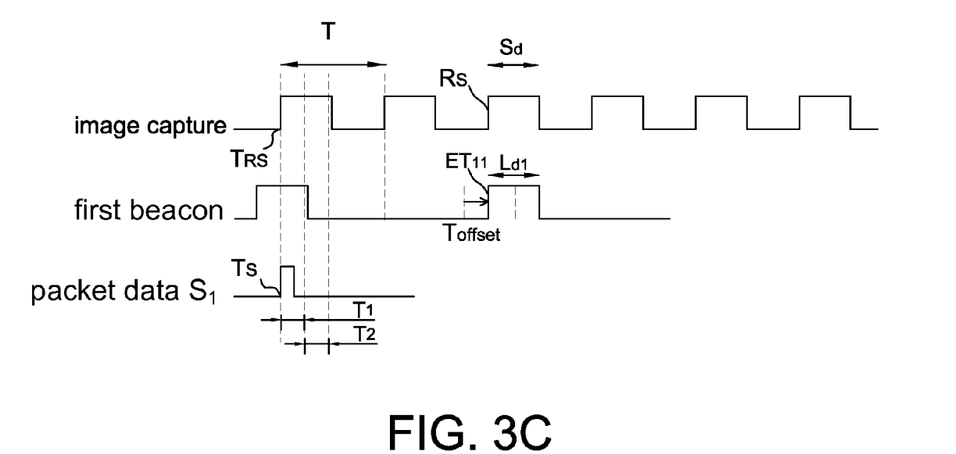

Referring to FIGS. 3A-3C, they show operation schematic diagrams of the synchronization method of the interactive imaging system according to a first embodiment of the present disclosure, wherein FIGS. 3A-3B show that the host 14 controls the at least one reference beacon to emit light after receiving the packet data $S_1$, whereas FIG. 3C shows that there is a time offset Toffset between the enable time of the at least one reference beacon and the sampling period T of the image sensor 21; that is, in FIG. 3C the at least one reference beacon was emitting light in a predetermined emission pattern before the receiving unit 13 receives the packet data $S_1$.

FIG. 3A shows that the image sensor 21 captures images within a sampling duration $S_d$ of a sampling period T; and that the transmission unit 23 sends the packet data $S_1$ synchronizing to the rising edge of sampling signal $R_S$; and that the first reference beacon 11 emits light in an emission pattern "ON OFF ON OFF . . . " and a lighting duration $L_{d1}$; and that the second reference beacon 12 emits light in an emission pattern "ON ON OFF ON ON OFF . . . " and a lighting duration $L_{d2}$; wherein the sampling duration $S_d$ may be larger than, smaller than or equal to the lighting durations $L_{d1}$ and $L_{d2}$. In this embodiment, it is assumed that the transmission unit 23 sends the packet data $S_1$ at a transfer time $T_S$, which is at the same time as a rising time $T_{RS}$ of the rising edge of sampling signal $R_S$; and that the receiving unit 13 receives the packet data $S_1$ after a propagation time $T_1$, and that the host 14 estimates an enable time $ET_{11}$ of the first reference beacon 11 and an enable time $ET_{12}$ of the second reference beacon 12 according to a processing time $T_2$ for processing the packet data $S_1$. In this embodiment, since an operating distance of the remote controller 2 is smaller than 1 km and the packet data $S_1$ travels in light speed, the propagation time $T_1$ is extremely close to 0 such that the propagation time $T_1$ may be ignored (i.e. $T_1$=0). Therefore, it is able to retrieve the rising time $T_{RS}$ based on the processing time $T_2$ and to estimate the enable times $ET_{11}$ and $ET_{12}$ based on the sampling period T. The processing time $T_2$ herein may include a decompression time and/or a decoding time for processing the packet data $S_1$. Preferably, the image system 1 further includes a memory unit 15 configured to previously save information associated with the processing unit $T_2$ and the sampling period T. In this manner, the host 14 may control the enable time according to the processing time $T_2$ and the sampling period T, e.g. $ET_{11}$ and $ET_{12}$ may be controlled to delay the processing time $T_2$ by a time difference ($T-T_2$) between the sampling period T and the processing time $T_2$.

FIG. 3B shows that the image sensor 21 captures images within a sampling duration $S_d$ of a sampling period T; and that the transmission unit 23 sends the packet data $S_1$ at a transfer time $T_S$ delaying a rising time $T_{RS}$ of the rising edge of sampling signal $R_S$ by a predetermined time interval $T_0$. For simplification, FIG. 3B only shows the operation timing of the first reference beacon 11 and omits that of the second reference beacon 12. The difference between FIG. 3B and FIG. 3A is that in FIG. 3B the processing unit 22 of the remote controller 2 post-processes the image data at first and then controls the transmission unit 23 to send the packet data $S_1$ after a predetermined time interval $T_0$ after receiving the image data from the image sensor 21 rather than controls the transmission unit 23 to send the packet data $S_1$ synchronizing to the rising edge of sampling signal $R_S$, wherein the predetermined time interval $T_0$ herein may include a compression time and/or an encoding time, but not limited thereto. No matter what kind of processes that the processing unit 22 processes the image data, the needed processing time (i.e. the predetermined time interval $T_0$ herein) is previously saved in the memory unit 15 of the image system 1. Similarly, as the propagation time $T_1$ may be ignored, the host 14 may control the enable time $ET_{11}$, e.g. based on the processing time $T_2$, the predetermined time interval $T_0$ and the sampling period T, to delay the processing time $T_2$ by a time difference [$T-(T_2+T_0)$] between the sampling period T and a summation of the processing time $T_2$ and the predetermined time interval $T_0$.

Referring to FIG. 3C, as the sampling frequency of the remote controller 2 and the system frequency of the image system 1 may have a time offset, e.g. an offset time Toffset, in this embodiment the remote controller 2 sends the packet data $S_1$ corresponding to a rising edge of sampling signal $R_S$ of the sampling period T of the image sensor 21. As the image system 1 previously saves a processing time $T_2$ for processing the packet data $S_1$, the host 14 may delay the enable time $ET_{11}$ of the at least one reference beacon to synchronize to a rising edge of sampling signal $R_S$ of the sampling period T according to the processing time $T_2$ embedded in the packet data $S_1$ and a relationship of a transfer time $T_S$ of the packet data $S_1$ with respect to a rising time $T_{RS}$ of the rising edge of sampling signal $R_S$, e.g. the transfer time $T_S$ is shown to be identical to the rising time $T_{RS}$ herein. It should be mentioned that, in FIG. 3C the transfer time $T_S$ of the packet data $S_1$ may delay the rising edge of sampling signal $R_S$ by a predetermined time interval $T_0$ as that shown in FIG. 3B.

Figure 4:
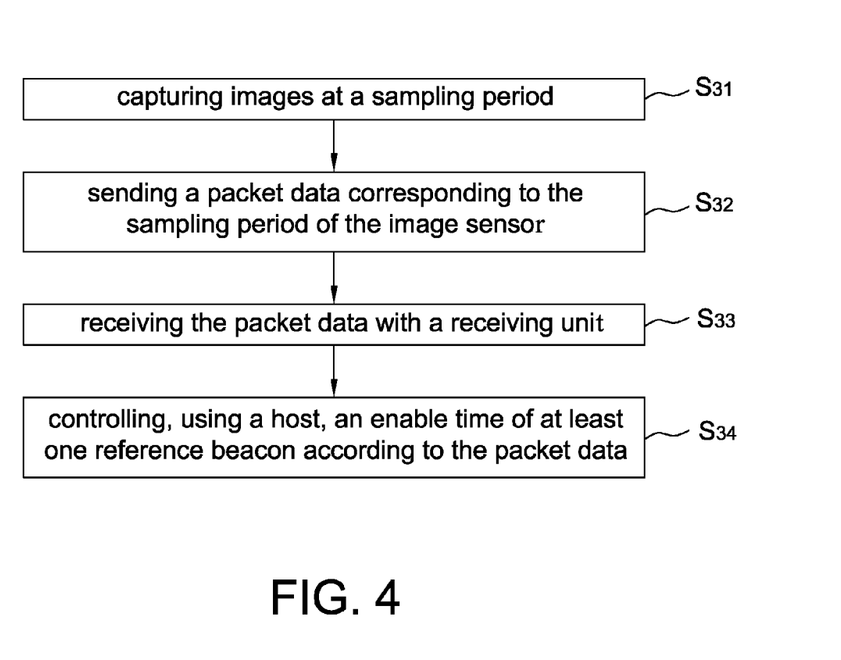
FIG. 4 shows a flow chart of the synchronization method of the interactive imaging system according to the first embodiment of the present disclosure.

Referring to FIG. 4, it shows a flow chart of the synchronization method of the interactive imaging system according to the first embodiment of the present disclosure, which includes the steps of: capturing, using an image sensor, images at a sampling period (Step $S_{31}$); sending, using a transmission unit, a packet data corresponding to a rising edge of sampling signal of the sampling period of the image sensor (Step $S_{32}$); receiving the packet data with a receiving unit (Step $S_{33}$); and controlling, using a host, an enable time of at least one reference beacon according to the packet data (Step $S_{34}$) thereby synchronizing the enable time to the sampling period.

Referring to FIGS. 2, 3A-3C and 4, details of the synchronization method according to the first embodiment of the present disclosure are illustrated below.

Step $S_{31}$: The image sensor 21 of the remote controller 2 captures images at a fixed sampling period T, and a sampling duration is assumed to be $S_d$.

Step $S_{32}$: The processing unit 22 controls the transmission unit 23 to send a packet data $S_1$ corresponding to the sampling period T of the image sensor 21.

For example in FIG. 3A, the transmission unit 23 sends the packet data $S_1$ at the same time as the rising edge of sampling signal $R_S$; in FIG. 3B, the transmission unit 23 sends the packet data $S_1$ delaying the rising edge of sampling signal $R_S$ by a predetermined time interval $T_0$, wherein the predetermined time interval $T_0$ may include a compression time and/or an encoding time processed by the processing unit 22. In other embodiments, said compression and/or encoding may be implemented by the transmission unit 23.

Step $S_{33}$: The receiving unit 13 receives the packet data $S_1$ and then transmits the received packet data $S_1$ to the host 15 for post-processing.

Step $S_{34}$: The host 14 controls an enable time of at least one reference beacon according to the packet data $S_1$. For example in FIG. 3A, the host 14 controls the enable time (e.g. $ET_{11}$, $ET_{12}$) to delay a processing time $T_2$ for processing the packet data $S_1$ by a time difference $(T-T_2)$ between the sampling period T and the processing time $T_2$, and the propagation time $T_1$ is assumed to be 0 herein; in FIG. 3B, the host 14 controls the enable time (e.g. $ET_{11}$) to delay a processing time $T_2$ for processing the packet data $S_1$ by a time difference $[T-(T_2+T_0)]$ between the sampling period T and, a summation of the processing time $T_2$ and the predetermined time interval $T_0$, and the propagation time $T_1$ is assumed to be 0 herein, wherein the processing time $T_2$ herein may include a decompression time and/or a decoding time.

In the first embodiment of the present disclosure, the host 14 controls the enable time (e.g. $ET_{11}$ and $ET_{12}$) of the reference beacon to synchronize to the rising edge of sampling signal $R_S$ of the sampling period T according to the packet data $S_1$; that is, the image system 1 previously saves information of a processing time $T_2$ for processing the received packet data $S_1$ or previously saves information of the processing time $T_2$ and a predetermined time interval $T_0$ delayed from the rising edge of sampling signal $R_S$ of the image sensor 21 that the remote controller 2 sends the packet data $S_1$. Therefore, when the host 14 receives the packet data $S_1$, it is able to retrieve the rising time $T_{RS}$ of the rising edge of sampling signal $R_S$ and to estimate the time that a next rising edge of sampling signal Rs will occur. When the at least one reference beacon did not operate before the packet data $S_1$ is received, the host 14 controls the at least one reference beacon to start to operate at the same time as a next rising time $T_{RS}$; and when the at least one reference beacon is already in operation, the host 14 delays the enable time of the at least one reference beacon to synchronize to the rising edge of sampling time $R_S$ of the sampling period T according to the packet data $S_1$, e.g. synchronizing to a next rising edge of sampling signal $R_S$.

Figure 5A:
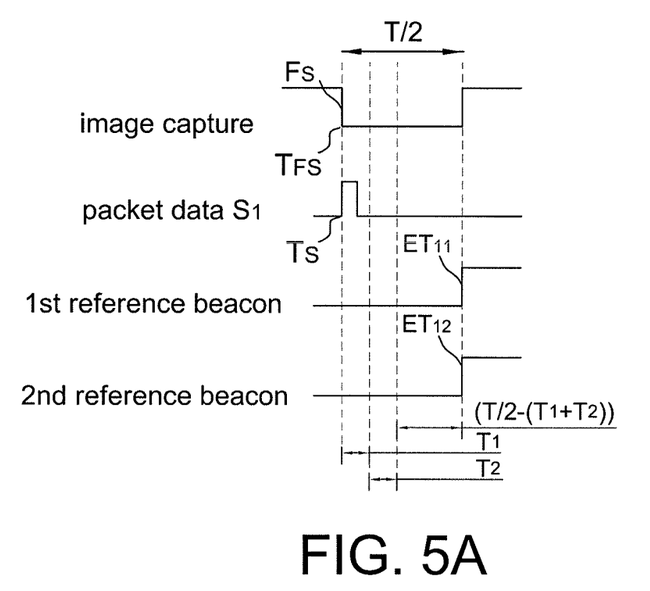
FIGS. 5A-5B show another operational schematic diagrams of the synchronization method of the interactive imaging system according to the first embodiment of the present disclosure.
Figure 5B:
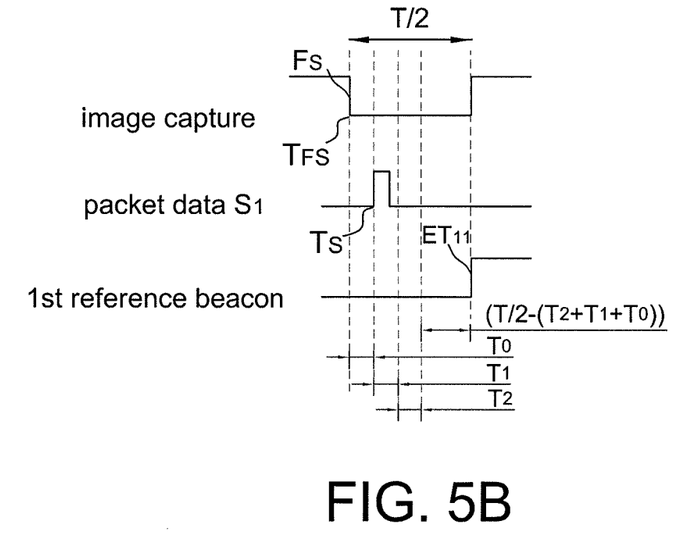

In another embodiment, the transmission unit 23 may also send the packet data $S_1$ corresponding to a falling edge of sampling signal $F_S$. As shown in FIG. 5A, when the transmission unit 23 sends the packet data $S_1$ synchronizing to the falling edge of sampling signal $F_S$, the host 14 controls the enable time (e.g. $ET_{11}$ and $ET_{12}$) to delay the processing time $T_2$ by a time difference $[T/2-T_2]$ between a half of the sampling period T/2 and the processing time $T_2$. As shown in FIG. 5B, when the transmission unit 23 sends the packet data $S_1$ delaying the falling edge of sampling signal $F_S$ by a predetermined time interval $T_0$, the host 14 controls the enable time (e.g. $ET_{11}$) to delay the processing time $T_2$ by a time difference $[T/2-(T_0+T_2)]$ between a half of the sampling period T/2 and a summation of the processing time $T_2$ and the predetermined time interval $T_0$, wherein the propagation time $T_1$ is assumed to be 0 in FIGS. 5A and 5B.

Figure 6:
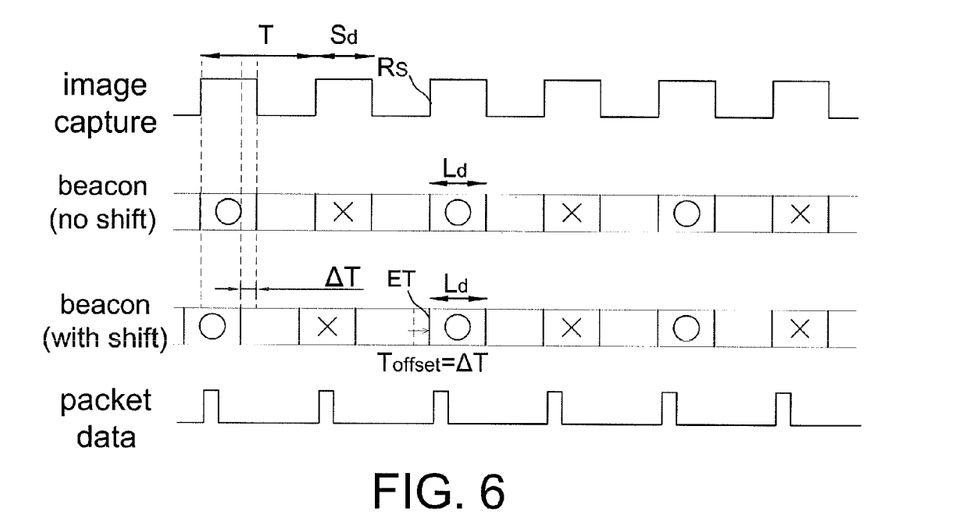
FIG. 6 shows an operational schematic diagram of the synchronization method of the interactive imaging system according to a second embodiment of the present disclosure.

Referring to FIGS. 2 and 6, FIG. 6 shows an operational schematic diagram of the synchronization method of the interactive imaging system according to a second embodiment of the present disclosure. The difference between the second embodiment and the first embodiment is that in the second embodiment the enable time of the reference beacon is determined by the remote controller 2 end. In addition, the second embodiment preferably includes only one reference beacon.

The interactive imaging system of the second embodiment also includes an image system 1 and a remote controller 2.

The image system 1 includes a reference beacon (e.g. one of the first reference beacon 11 and the second reference beacon 12), a receiving unit 13 and a host 14. The reference beacon emits light in an emission pattern, e.g. in an emission pattern "ON OFF ON OFF . . . " as shown in FIG. 6 (i.e. the first reference beacon 11). The receiving unit 13 is configured to receive a packet data $S_1$, wherein as described in the first embodiment the packet data $S_1$ may be transmitted by means of wireless transmission technologies. The host 14 controls an enable time ET of the reference beacon according to the packet data $S_1$, and the content of the packet data $S_1$ is determined by the remote controller 2.

The remote controller 2 includes an image sensor 21, a processing unit 22 and a transmission unit 23. The transmission unit 23 is controlled by the processing unit 22 to send the packet data $S_1$. The image sensor 21 receives the light emitted by the reference beacon at a sampling period T. In this embodiment, the packet data $S_1$ may be sent at any time within the sampling period T. The processing unit 22 is configured to calculate a time ratio Tr of a time interval that the image sensor 21 receives the light emitted from the reference beacon with respect to the sampling period T (e.g. according to the ratio of average brightness) so as to determine a shift time ΔT and to add information of the shift time ΔT to the packet data $S_1$, e.g. adding to the header or data of the packet data $S_1$ without any limitation. When the shift time ΔT is 0, there is no phase shift between the sampling duration $S_d$ of the image sensor 21 and the lighting duration $L_d$ of the reference beacon. When the shift time ΔT is not 0, there is a phase shift between the sampling duration $S_d$ of the image sensor 21 and the lighting duration $L_d$ of the reference beacon and it should be adjusted.

In the second embodiment, the lighting duration $L_d$ that every time the reference beacon lights is preferably equal to the sampling duration $S_d$ that every time the image sensor 21 captures an image. In this manner, it is easier for the processing unit 22 to calculate the time ratio Tr and the shift time ΔT. When the host 14 obtains that the shift time ΔT is not equal to 0, the host 14 delays the enable time ET to synchronize to a rising edge of sampling signal $R_S$ of the sampling period T according to the information added in the packet data $S_1$. In other words, the host 14 delays the enable time ET of the reference beacon by the shift time ΔT; i.e. the reference beacon is controlled to maintain its current operation state before the enable time ET.

Figure 7:
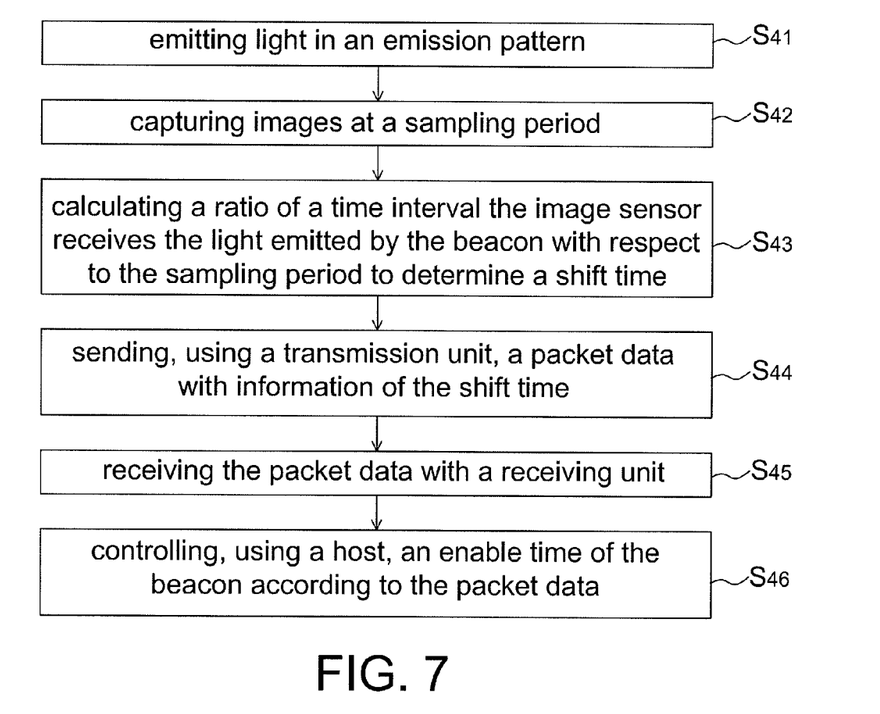
FIG. 7 shows a flow chart of the synchronization method of the interactive imaging system according to the second embodiment of the present disclosure.

As mentioned above, FIG. 7 shows a flow chart of the synchronization method of the interactive imaging system according to the second embodiment of the present disclosure, which includes the steps of: emitting, using a reference beacon, light in an emission pattern (Step $S_{41}$); capturing, using an image sensor, images at a sampling period (Step $S_{42}$); calculating, using a processing unit, a time ratio of a time interval that the image sensor receives the light emitted from the reference beacon with respect to the sampling period to determine a shift time (Step $S_{43}$); sending, using a transmission unit, a packet data with information of the shift time (Step $S_{44}$); receiving the packet data with a receiving unit (Step $S_{45}$); and controlling, using a host, an enable time of the reference beacon according to the packet data (Step $S_{46}$). Details of the second embodiment have been described in FIG. 6 and corresponding descriptions thereof and thus will not be repeated herein.

It should be mentioned that the remote controller 2 is not necessary to add the information of adjusting the enable time of the reference beacon in every packet data $S_1$ to be sent and the adjustment information may be sent at an adjusting frequency according to the accuracy and the tolerance required.

It should be mentioned that the relationship between the emission pattern of the reference beacon and the signal timing in the above embodiments is only exemplary and not to limit the present disclosure.

In every embodiment of the present disclosure, it is not necessary to perform bidirectional synchronization between the image system 1 and the remote controller 2. The synchronization procedure may be accomplished according to the transmission information sent from the remote controller 2 in a unidirectional manner so as to simplify the synchronization procedure and reduce the occupied system resources.

As mentioned above, the synchronization method of the conventional interactive imaging system has to employ oversampling mechanism or bidirectional synchronization mechanism such that the occupied system resources can be increased. Therefore, the present disclosure further provides an interactive imaging system and a remote controller applied thereto (FIG. 2) that may accomplish the synchronization procedure between the image sensor and reference beacons according to the unidirectional transmission information from the remote controller and reduce the sampling frequency of the image sensor.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An interactive imaging system, comprising:
an image system, the image system comprising:
at least one reference beacon configured to emit light repeatedly in an emission pattern, the emission pattern comprising at least one emission interval and at least one deactivation interval;
a receiving unit configured to receive a packet data; and
a host configured to control an enable time of the emission pattern of the at least one reference beacon according to the packet data; and
a remote controller, the remote controller comprising:
an image sensor configured to capture the light emitted from the at least one reference beacon at a sampling period; and
a transmission unit configured to send the packet data to the receiving unit in accordance with the sampling period of the image sensor to shift the enable time of the emission pattern, wherein
the at least one reference beacon is configured to emit light repeatedly in the emission pattern before the receiving unit receives the packet data from the transmission unit of the remote controller, and
the host is configured to shift the enable time of a next emission pattern of the at least one reference beacon after the receiving unit receives the packet data from the transmission unit of the remote controller.

2. The interactive imaging system as claimed in claim 1, wherein the transmission unit is configured to send the packet data
synchronized with a rising edge or a falling edge of a sampling signal of the sampling period, or
delayed from the rising edge or the falling edge of the sampling signal of the sampling period by a predetermined time interval.

3. The interactive imaging system as claimed in claim 2, wherein the host is configured to estimate the enable time of the next emission pattern according to a processing time of the packet data.

4. The interactive imaging system as claimed in claim 3, wherein the processing time comprises at least one of
a decompression time during which the packet data is decompressed by the processing unit, and
a decoding time during which the packet data is decoded by the processing unit.

5. The interactive imaging system as claimed in claim 3, wherein when the transmission unit sends the packet data synchronized with the rising edge of the sampling signal, the enable time is delayed from the processing time by a time difference between the sampling period and the processing time.

6. The interactive imaging system as claimed in claim 3, wherein when the transmission unit sends the packet data synchronized with the falling edge of sampling signal, the enable time is delayed from the processing time by a time difference between a half of the sampling period and the processing time.

7. The interactive imaging system as claimed in claim 3, wherein when the transmission unit sends the packet data delayed from the rising edge of the sampling signal by the predetermined time interval, the enable time is delayed from the processing time by a time difference between (i) the sampling period and (ii) a summation of the processing time and the predetermined time interval.

8. The interactive imaging system as claimed in claim 3, wherein when the transmission unit sends the packet data delayed from the falling edge of sampling signal by the predetermined time interval, the enable time is delayed from the processing time by a time difference between (i) a half of the sampling period and (ii) a summation of the processing time and the predetermined time interval.

9. The interactive imaging system as claimed in claim 3, wherein the image system further comprises a memory unit configured to previously save the processing time and the sampling period.

10. The interactive imaging system as claimed in claim 2, wherein the predetermined time interval comprises at least one of a compression time and an encoding time.

11. The interactive imaging system as claimed in claim 1, wherein the host is configured to delay the enable time of the next emission pattern of the at least one reference beacon to synchronize with a rising edge of a sampling signal of the image sensor according to the packet data.

12. An interactive imaging system, comprising:
an image system, the image system comprising:
a reference beacon configured to emit light repeatedly in an emission pattern, the emission pattern comprising at least one emission interval and at least one deactivation interval;
a receiving unit configured to receive a packet data; and
a host configured to control an enable time of the emission pattern of the reference beacon according to the packet data;
a remote controller, the remote controller comprising:
a transmission unit configured to send the packet data to the receiving unit;
an image sensor configured to receive the light emitted by the reference beacon at a sampling period; and
a processing unit configured to
calculate average brightness of the light that the image sensor receives from the reference beacon within the sampling period for determining a shift time, and
add information of the shift time to the packet data to shift the enable time of the emission pattern, wherein
the reference beacon is configured to emit light repeatedly in the emission pattern before the receiving unit receives the packet data from the transmission unit of the remote controller, and
the host is configured to shift the enable time of a next emission pattern of the reference beacon after the receiving unit receives the packet data from the transmission unit of the remote controller.

13. The interactive imaging system as claimed in claim 12, wherein the emission interval of the reference beacon is equal to the sampling period of the image sensor.

14. The interactive imaging system as claimed in claim 12, wherein the host is configured to delay the enable time of the next emission pattern of the reference beacon to synchronize with a rising edge of a sampling signal of the image sensor according to the packet data.

15. The interactive imaging system as claimed in claim 12, wherein the host is configured to delay the enable time of the next emission pattern of the reference beacon by the shift time.

16. A remote controller, applied to an interactive imaging system, the remote controller comprising:
an image sensor configured to receive light repeatedly emitted by a reference beacon included in the interactive imaging system to capture images at a sampling period; and
a transmission unit configured to send a packet data at a transfer time in accordance with the sampling period of the image sensor to shift an enable time of an emission pattern of the reference beacon, wherein
the emission pattern comprises at least one emission interval and at least one deactivation interval,
the reference beacon is configured to emit the light repeatedly in the emission pattern before the transmission unit sends the packet data at the transfer time, and
the enable time of a next emission pattern of the reference beacon after the transmission unit sends the packet data at the transfer time is shifted according to the packet data.

17. The remote controller as claimed in claim 16, wherein the packet data is an infrared signal.

18. The remote controller as claimed in claim 16, wherein the transfer time is
at a rising edge or a falling edge of a sampling signal of the sampling period, or
delayed by a predetermined time interval from the rising edge or the falling edge of the sampling signal of the sampling period.

19. The interactive imaging system as claimed in claim 1, wherein
the emission interval is a time interval during which the reference beacon emits light,
the deactivation interval is a time interval during which the reference beacon does not emit light, and
the enable time is a time point at which the reference beacon starts to emit light in the emission pattern.

20. The interactive imaging system as claimed in claim 12, wherein
the emission interval is a time interval during which the reference beacon emits light,
the deactivation interval is a time interval during which the reference beacon does not emit light, and
the enable time is a time point at which the reference beacon starts to emit light in the emission pattern.

* * * * *